(12) United States Patent
Yoshida

(10) Patent No.: US 6,415,241 B1
(45) Date of Patent: Jul. 2, 2002

(54) DISTANCE MEASUREMENT SYSTEM

(75) Inventor: Hideo Yoshida, Saitama (JP)

(73) Assignee: Fuji Photo Optical Co., Ltd., Omiya (JP)

( * ) Notice: Subject to any disclaimer, the term of this patent is extended or adjusted under 35 U.S.C. 154(b) by 0 days.

(21) Appl. No.: 09/400,430

(22) Filed: Sep. 21, 1999

(30) Foreign Application Priority Data

Sep. 21, 1998 (JP) .............................. 10-266447

(51) Int. Cl.[7] .................... G01C 22/00; G03B 13/00
(52) U.S. Cl. ................ 702/159; 702/158; 396/104; 396/106
(58) Field of Search ................ 702/135, 149, 702/158, 159; 396/104, 106, 120, 123, 125; 356/3.04, 3.08, 4.01

(56) References Cited

U.S. PATENT DOCUMENTS

| | | | |
|---|---|---|---|
| 5,659,387 A | 8/1997 | Yoshida | |
| 6,026,246 A | * 2/2000 | Yoshida et al. | ............. 396/106 |
| 6,160,613 A | * 12/2000 | Takasaki et al. | ........... 356/3.08 |
| 6,173,122 B1 | * 1/2001 | Matsumoto et al. | ........ 396/104 |
| 6,188,844 B1 | * 2/2001 | Yoshida | ....................... 396/106 |

FOREIGN PATENT DOCUMENTS

| | | |
|---|---|---|
| JP | 8-94920 | 4/1996 |
| JP | 8-94922 | 4/1996 |

* cited by examiner

*Primary Examiner*—Bryan Bui
(74) *Attorney, Agent, or Firm*—Leydig, Voit & Mayer, Ltd.

(57) ABSTRACT

In a distance measure system, an autofocus integrated circuit is furnished with a power source voltage and an integrating capacitor is preliminarily charged to a reference voltage $V_{REF}$. A temperature sensor detects ambient temperature. Thereafter, under the control of a CPU, an infrared emitting diode emits pulsed infrared light and the integrating capacitor discharges by a voltage level corresponding to a distance to an object to be measured. On the occasion of integration by an integrating unit of a signal output from an arithmetic unit, discharging of the integrating capacitor is performed multiple times, corresponding to the ambient temperature measured by a temperature sensor.

6 Claims, 8 Drawing Sheets

RELEASE

VOLTAGE OF INTEGRATING CAPACITOR

SWITCH6

SWITCH3

TEMPERATURE MEASURING ACTION

DISTANCE MEASUREMENT SYSTEM

BACKGROUND OF THE INVENTION

1. Field of the Invention

The present invention relates to a system for measuring a distance to an object to be measured and more particularly to an active distance measurement system favorably applied to various types of cameras.

2. Related Background Art

Such an active distance measurement system applied to cameras generally includes an infrared-emitting diode (IRED) for emitting an infrared beam toward an object to be measured, and a position sensitive detector (PSD) for receiving the object-reflected infrared beam. The signal output from the PSD is a signal responsive to a position where the object-reflected infrared beam is received. A signal processing and arithmetic unit determines a distance to the object 30 from this signal. Because a large error may occur at once measurement, averaging of multiple pieces of distance information is generally performed to obtain more accurate distance information.

FIG. 9 shows a circuit diagram illustrating a configuration of an integrating unit used for obtaining the average of the multiple pieces of distance information in the distance measurement system. This integrating unit 16 comprises a switch 1, an integrating capacitor 2, a switch 3, a constant current source 4, an operational amplifier 5, a switch 6, a reference power source 7, and a comparator 8. The negative input terminal of the operational amplifier 5 is connected through the switch 1 to the output terminal of an arithmetic unit 15 and grounded through the integrating capacitor 2. Furthermore the negative input terminal of the operational amplifier 5 is connected through the switch 3 to the constant current source 4, and connected through the switch 6 to the output terminal of the operational amplifier 5. Also, the positive input terminal of the operational amplifier 5 is connected to the reference power source 7, which provides a reference voltage $V_{REF}$. The comparator 8 is connected to the junction between the negative terminal of the operational amplifier 5 and the integrating capacitor 2 and compares the potential of the junction and the reference voltage $V_{REF}$ to find out which is higher. The comparator 8 outputs a signal corresponding to the comparison results. A central processing unit (CPU) 19 receives the signal output from the comparator 8 and controls the on-off operation of the switches 1, 3 and 6.

As an example of the distance measurement system using such an integrating unit 16 is a distance measurement system mounted in a camera. When a shutter release button is half- or partially-depressed after powering on the camera, the CPU 19 turns on the switch 6 to charge the integrating capacitor 2. As the result, the integrating capacitor 2 is charged to the reference voltage $V_{REF}$ provided by the reference power source 7. After the charging up, the switch 6 is turned off and retained in such a state.

Then, the IRED emits infrared pulses and the switch 1 is turned on. As a result, output signals (distance information) from the arithmetic unit 15 are input into the integrating capacitor 2 as negative voltages. The voltage across the integrating capacitor 2 decrementally changes step by step in value corresponding to each distance measurement information. This is called a "first integrating".

After the predetermined number (e.g., 256) of negative voltage inputs (discharges) into the integrating capacitor 2 are completed, the switch 1 is turned off and the switch 3 is turned on in response to control signals from the CPU, whereby the integrating capacitor 2 is charged at a fixed speed defined by the power rating of the constant current source 4. This is called a "second integrating".

All the while of the second integrating, the comparator 8 compares the voltage level of the integrating capacitor 2 and the reference voltage $V_{REF}$. If the comparator 8 estimates that they are coincident with each other then the comparator 8 turns the switch 3 off to stop charging the integrating capacitor 2, i.e. finish the second integrating. The CPU 19 counts a charging time of capacitor 2 (length of time spent in the second integrating). As the charging speed by the constant current source 4 is uniform, the sum of the signal voltages input into the integrating capacitor 2 during the first integrating can be determined from the aforementioned charging time of capacitor 2. The distance to the object can be determined based on the resultant sum. On the basis of the obtained distance to the object, the CPU 19 controls a driving of lens to focus properly on the object to be imaged.

SUMMARY OF THE INVENTION

With such a distance measurement system, as the operating characteristics of the signal processing and arithmetic unit vary with temperature, not only the discharging characteristics of the integrating capacitor 2, but also the process of second integrating. Thus, there is a problem that distance measurement accuracy may be highly dependent on temperatures.

It order to remove such a problem, one suggested solvent is using a transformation that compensate for changes in temperatures. Such a transformation may be used for determining the distance to the object or driving lens. However, since parameters used in the transformation are real numbers, it is necessary to provide a large capacity of memory device (e.g., an; EEPROM; electrically erasable and programmable ROM) storing such parameters therein. The transformation also loads on the CPU.

In order to solve the above-mentioned problems, it is an object of the present invention to provide a distance measurement system, which can measure a distance with high accuracy and with low CPU load regardless of changes in temperature.

To achieve the above object, a distance measurement system according to the present invention is a active distance measurement system comprising: (1) a light source for emitting a predetermined series of light pulses toward the object to be measured; (2) a PSD for receiving object-reflected light pulses and outputting signals each corresponding to the position where the object-reflected pulse is received; (3) an arithmetic unit for outputting signals each corresponding to the distance to the object in response to signals output from said PSD; (4) an integrating capacitor set to a first reference voltage before emitting said series of light pulses, said capacitor being charged or discharged in response to said signals output from said arithmetic unit; (5) a distance detection unit for detecting the distance to the object based on a voltage of said capacitor present after emitting said series of light pulses; (6) a temperature sensing unit for measuring an ambient temperature; and (7) a control unit for controlling said distance measurement system so as to adjust the charging and discharging operation of said capacitor in response to the ambient temperature measured by said temperature sensing unit.

According to the present invention, a series of light pulses are emitted toward the object to be measured from the light source. These pulses are reflected by the object and thus object-reflected pulses are received by the PSD. The position where the object-reflected pulse is received changes responsive to the distance to the object. The PSD outputs a signal dependent on this light-receiving position. The arithmetic unit determines the distance to the object by the output signal from the PSD with a given calculation and outputs the distance signal. The arithmetic unit outputs distance signals each corresponding to a result of distance measurement by single pulse emission. The integrating unit is charged or discharged in response to each distance signal so that the distance signals are integrated. The distance detecting unit outputs the average of distance measurement values. At this conjuncture, the charging and discharging operation of the integrating capacitor is adjusted based on the temperature measured by the temperature sensing unit, so that the integrated results of the integrating capacitor become independent of the temperature, but only dependent on the distance to the object. This results in accurate measurements.

Furthermore, the control unit favorably adjusts one or both of the number and periods of the charges or discharges of the integrating capacitor. In the case of the number of charges or discharges being fixed, each period of charge or discharge may be adjusted, or some periods of charge or discharge may be adjusted.

Especially, it is preferable to accomplish the adjustment by adjusting the number of charges or discharges of the integrating capacitor referred to a predetermined number. The period of charge or discharge of the integrating capacitor is preferably adjusted below the predetermined reference period. This is effective for the removal of standing-light component. In these cases, the adjustments may be made easier and a capacity of storing program may be diminished.

The control unit in the distance measurement system according to the present invention may adjust the output signal from the arithmetic unit response to the ambient temperature measured by the temperature sensing unit to adjust the charging and discharging operation of the integrating capacitor.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE PREFERRED EMBODIMENTS

Figure 1:
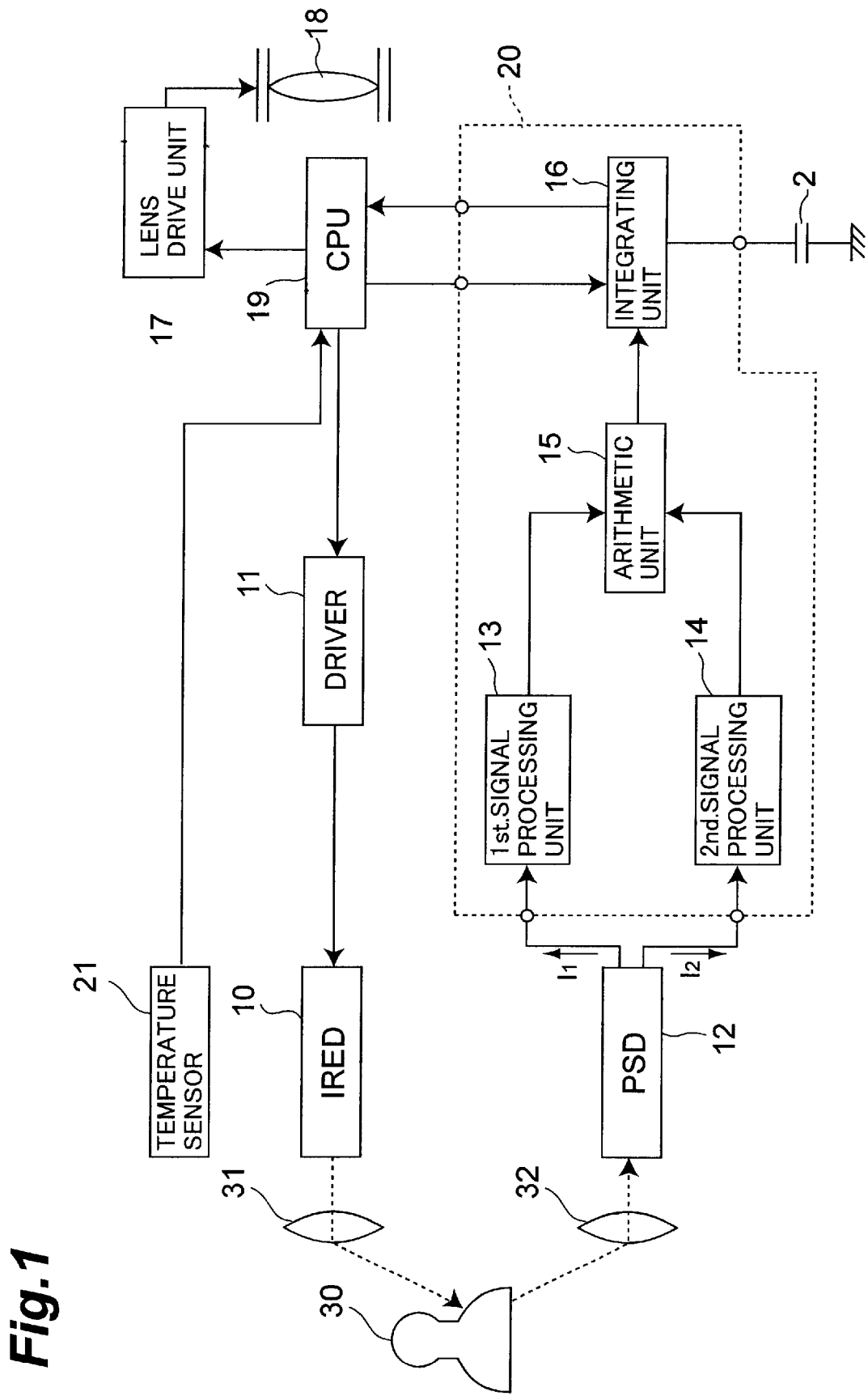
FIG. 1 is a block diagram of a distance measurement system according to a preferred embodiment of the present invention.

The embodiments according to the invention will now be described in more detail with the accompanying drawings. To facilitate the comprehension of the explanation, the same reference numerals denote the same parts, where possible, throughout the drawings, and a repeated explanation will be omitted. Although the embodiments according to the present invention are described below regarding active distance measurement systems applied as those for using in autofocus cameras, the invention is certainly not limited thereto.

First Example

A distance measurement system according to the first embodiment of the present invention will now be explained below with reference to FIG. 1, which is a block diagram of the distance measurement system according to the first embodiment. This distance measurement system comprises an infrared-emitting diode (IRED) 10 for emitting infrared radiation through a light-projecting lens 31 to an object 30, a driver 11 for driving the IRED 10, a position sensitive detector (PSD) 12 receiving through a light-receiving lens 32 the object-reflected infrared radiation, and a temperature sensor 21 for detecting a temperature.

The distance measurement system further comprises first and second signal processing units 13 and 14 for processing, respectively, signal currents $I_1$, and $I_2$ output from the PSD 12, an arithmetic unit 15 for calculating distance information in response to the signals output from these signal processing units 13 and 14, an integrating unit 16 for integrating the distance information signals output from the arithmetic unit 15, a lens 18 for producing an image of the object 30 on an imaging film, a lens drive unit 17 for driving the lens 18 to achieve proper focus to the object 30, and a central processing unit (CPU) 19 for controlling the whole of a camera including the above distance measurement system therein. In addition, it is noted that the first signal processing unit 13, the second signal processing unit 14, the arithmetic unit 15, the integrating unit 16 and the charging circuit 21 are installed in an autofocus integrated circuit (AFIC) 20 which mounted on the camera.

The CPU 19 controls the operation of camera containing this distance measurement system based on programs and parameters preliminarily stored in a memory (not shown), such as an electrically erasable and programmable read-only memory (EEPROM). In the distance measurement system shown in this figure, the CPU 19 controls the driver 11 to bring the infrared output of the IRED 10 under control and receives the temperature measured by the temperature sensor 21. Furthermore, the CPU 19 controls the operation of the AFIC 20 and receives the signal output from the AFIC 20 to determine the distance to the object 30 so as to drive the lens 18 by the lens drive unit 17 for focussing operation.

Under the control of the CPU 19, the IRED 10 first emits infrared radiation through the light-projecting lens 31 toward the object 30. This infrared radiation is reflected by the object 30 and the PSD 12 receives the reflected infrared radiation through the light-receiving lens 32. The PSD 12 outputs the signal currents $I_1$ and $I_2$ in response to the positions where the reflected infrared radiation is received. The first signal processing unit 13 receives the signal current $I_1$ output from the PSD 12 and the second signal processing unit 14 receives the signal current $I_2$ output from the PSD 12, each unit performing processing such as removal of a standing-light component. The arithmetic unit 15 accepts the output signals from the first and second signal processing units 13 and 14, and output a distance information signal corresponding to output ratio $I_1/(I_1+I_2)$ of the PSD 12.

During one distance measurement operation, the IRED 10 infrared light pulses at a frequency responsive to the temperature measured by the temperature sensor 21. So the number of the distance information signals output from the arithmetic unit 15 equal to the number of pulses. Thus, the integrating unit 16 performs the integration processing of the distance information signals as many as pulses and outputs the integrating result to the CPU 19. The CPU 19 determines a distance to the object based on the integrating result and controls the lens drive unit 17 so as to drive the lens 18 for precious focus.

Figure 2:
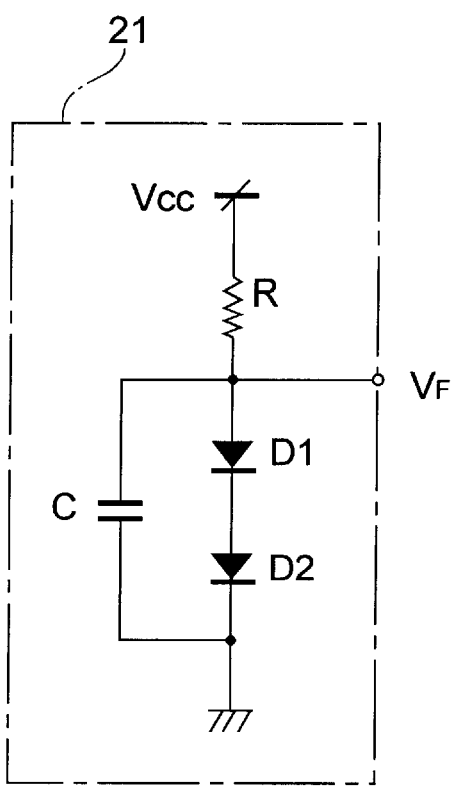
FIG. 2 is a circuit diagram showing one example of a temperature sensor in the distance measurement system of FIG. 1.
Figure 3:
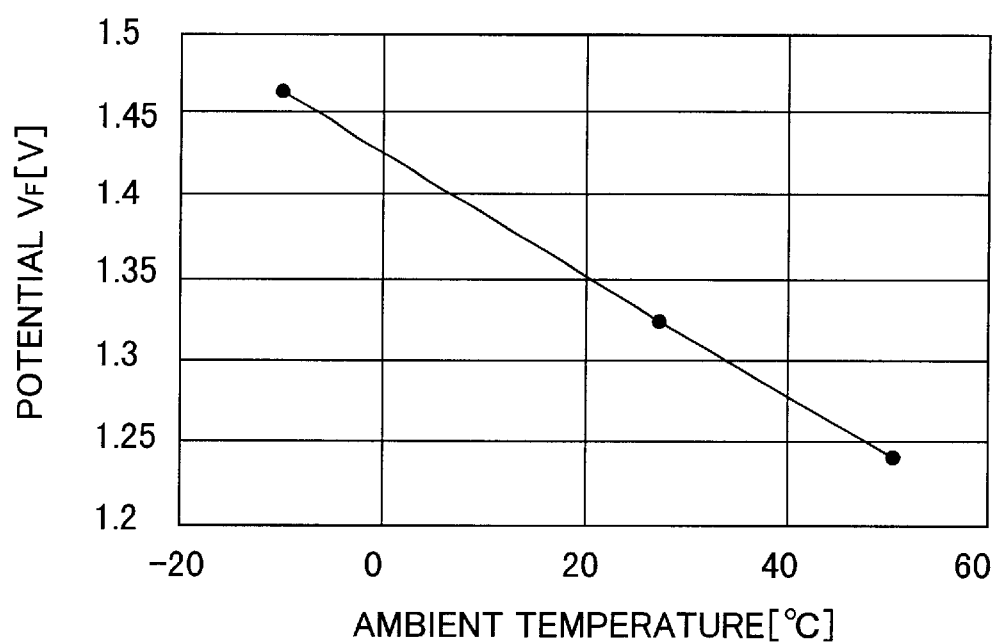
FIG. 3 is a graph showing characteristics of the temperature sensor of FIG. 2.

The temperature sensor 21 will be described hereinafter. Referring to FIG. 2, the temperature sensor 21 is shown by way of example only. The temperature sensor 21 shown in this figure has a configuration that a resistor R and diodes D1 and D2 are connected in tandem between the terminal of a constant potential $V_{cc}$ and the ground, with a capacitor C being parallel connected across the series circuit consisting of the diodes D1 and D2. The characteristics of the diodes D1 and D2 are dependent on temperature. As will be understood from the characteristic graph of the temperature sensor 21 shown in FIG. 3, a potential $V_F$ at the junction of the resistor R and the diode D1 is also dependent on temperature. Thus, when the potential $V_F$ is input into the CPU 19, the CPU 19 can determine the value of the temperature based on the input potential.

Figure 9:
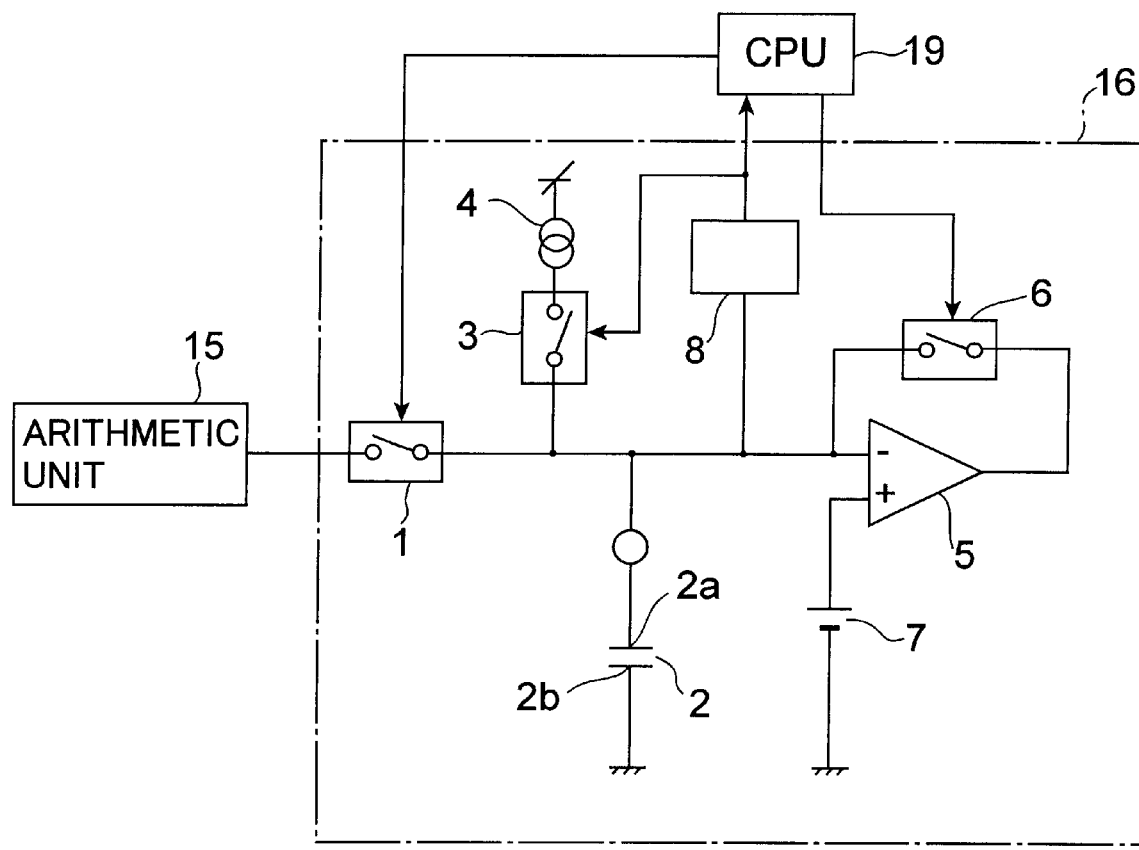
FIG. 9 is a diagram showing a conventional integrating unit in the prior distance measurement system.

Next, the details of the integrating unit 16 will be explained below. The integrating unit 16 in the preferred embodiments includes a ceramic condenser as an integrating capacitor 2, which is attached external to the AFIC 20. As the integrating unit 16 used in the present embodiment may be substantially consistent with that of the prior art, it will be explained with reference to FIG. 9. The integrating unit 16 in the present embodiment comprises a switch 1, a switch 3, a constant current source 4, an operational amplifier 5, a switch 6, a reference power supply 7, and a comparator 8, in addition to the above integrating capacitor 2. The negative terminal of the operational amplifier 5 is connected through the switch 1 to the output terminal of the arithmetic unit 15 and grounded through the integrating capacitor 2. Also, the negative terminal of the operational amplifier 5 is connected through the switch 3 to the constant current source 4, and through the switch 6 to the output terminal of the operational amplifier 5. The positive terminal of the operational amplifier 5 is connected to the reference power supply 7, which provides a reference voltage $V_{REF}$. The comparator 8 is connected to the junction between the negative terminal of the operational amplifier 5 and the integrating capacitor 2 and compares the potential of the junction and the reference voltage $V_{REF}$. The comparator 8 outputs a signal corresponding to the comparison results. The CPU 19 receives the signal output from the comparator 8 and controls the on-off operation of the switches 1, 3 and 6.

Figure 4A:
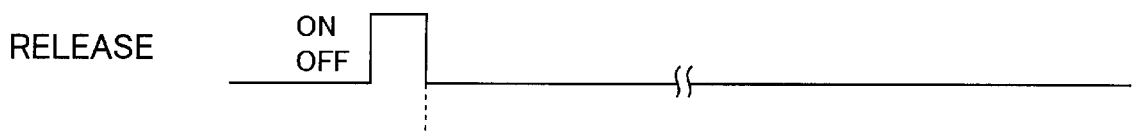
FIGS. 4A to 4E are timing charts for explaining the operation of the distance measurement system shown in FIG. 1.
Figure 4B:
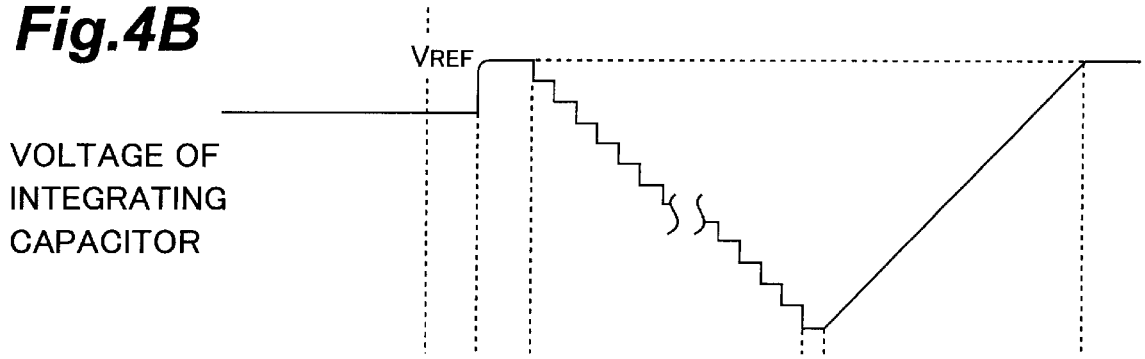
Figure 4C:
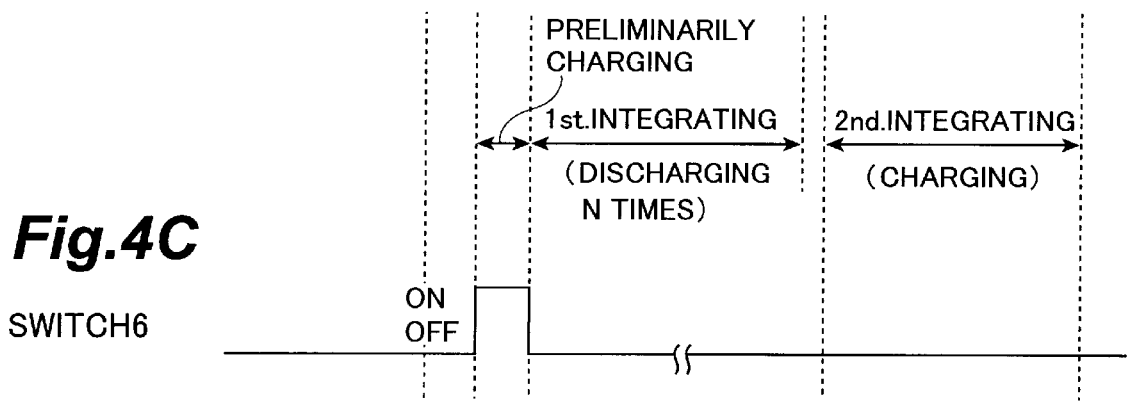

Next, the operation of the distance measurement according to the aforementioned preferred embodiment would be explained. When the shutter release button is half depressed under conditions that the camera is powered up, the distance measuring procedures start (FIG. 4A). Then, the power source voltage is-supplied to the AFIC 20 and the switch 6 is turned on, so that the integrating capacitor 2 can be preliminarily charged to the reference voltage $V_{REF}$. Into the CPU 19, not only the luminance data measured by a photometric sensor (not shown), but also the temperature data measured by the temperature sensor 21 is input. The CPU 19 determines the number of pulses N emitted from the IRED 10 (equals to the number of the discharges of the integrating capacitor 2) during the first integrating. It is noted that the measurements of these luminance and temperature data and the calculation of the number N are carried out before the preliminarily charging at the start of the distance measurement (FIG. 4E). In other words, the switch 6 is not turned on until the temperature-measuring operation ends (see FIG. 4C).

After the preliminarily charging, the switch 6 is turned off, and the IRED 10 is driven by an emission timing signal having a duty ratio output from the CPU 19 to the driver 11 and emits a series of infrared light pulses consisted of N pulses. The infrared pulses emitted from the IRED 10 are reflected by the object 30 and received by the PSD 12. The arithmetic unit 15 outputs the data of output ratio $I_1/(I_1+I_2)$ for each pulse as a distance information signal. The distance information signals are transferred to the integrating unit 16. The CPU 19 controls the switch 1 in synchronous with the emission of pulses from the IRED 10. The distance information signals are input into the integrating capacitor 2 as negative voltage.

The capacitor 2 discharges by the voltage represented by each distance information signal. In other words, the voltage across the integrating capacitor 2 decreases step by step, as shown in FIG. 4B, whenever receiving each distance information signal (first integrating). A voltage drop per each step may represent by itself distance information corresponding to a distance to the object 30.

Figure 4D:
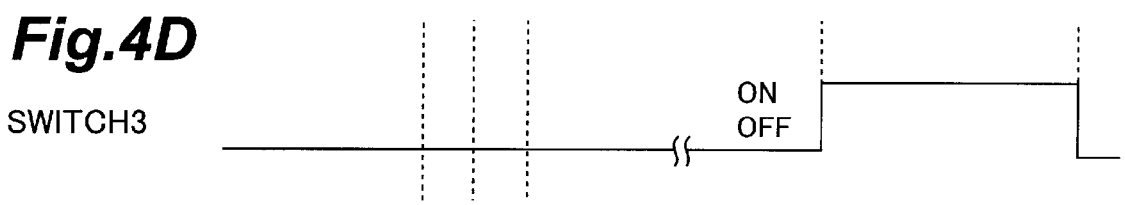
Figure 4E:
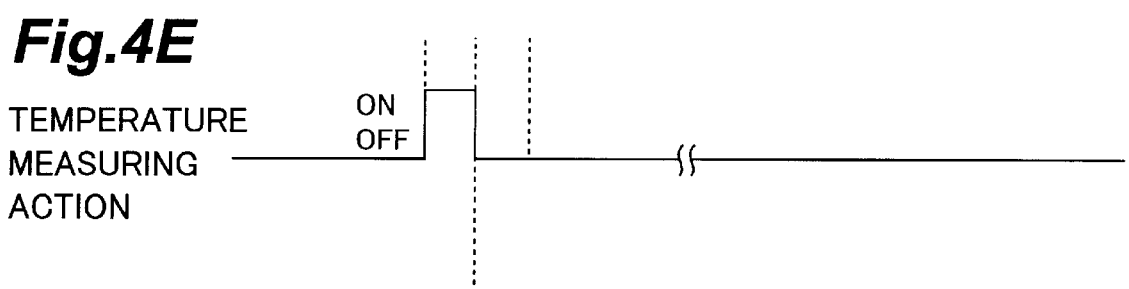

After the integrating capacitor 2 has completed the discharging N times, the switch 6 is maintained off and the switch 3 is turned on by the signal from the CPU 19 (see FIG. 4D). This causes the integrating capacitor 2 to be charged at a predetermined speed determined by the power rating of the constant current source 4 (second integrating).

During the period of the second integrating, the comparator 8 compares the voltage of the integrating capacitor 2 and the reference voltage $V_{REF}$ and when estimated that they are coincident with each other, causes the switch 3 to be turned off. This causes the charging of the integrating capacitor 2 to be stopped and the CPU 19 to commence determining a length of time required to perform the second integrating. As the charging speed by the constant current source 4 is uniform, the sum of the signal voltages input in the integrating capacitor 2 during one distance measurement can be obtained. That is, as the number of discharges is known, the average of the distance information signals or the average distance to the object 30 can be determined based on the sum.

Subsequently, the shutter release button is fully depressed and then the CPU 19 operates to control the lens drive unit 17 based on the determined distance so as to appropriately adjust the focus of the lens 18. Also, a shutter (not shown) opens causing exposure film to light. In this manner, the release manipulation can be followed by the aforementioned series of shooting procedures comprising the preliminarily charging, distance measuring (first and second integrating), focussing and exposing.

Figure 5A:
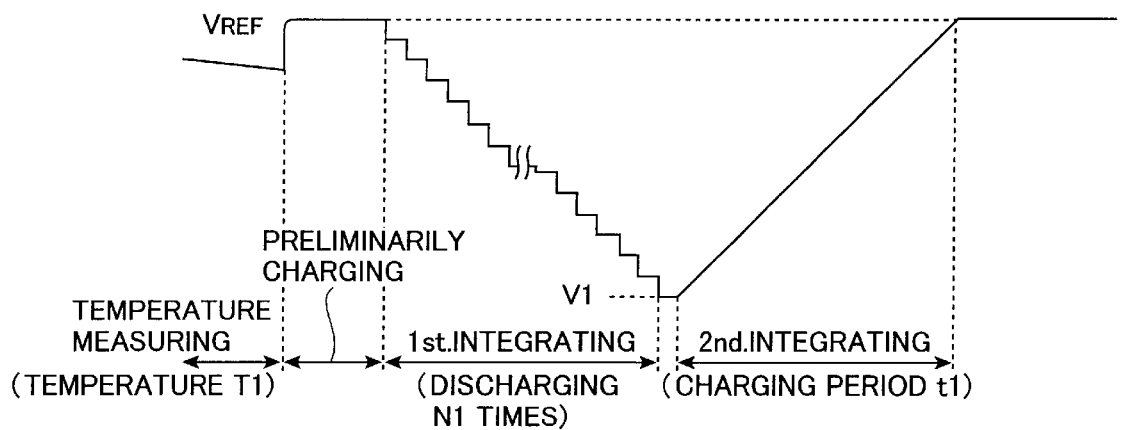
FIGS. 5A and 5B are views for explaining the relation between the temperature T and the number of discharges N.

The relation between the temperature T detected by the temperature sensor 21 and the number of pulses N emitted from the IRED 10 (equals to the number of discharges of the integrating capacitor 2 during the first integrating) will be described in detail hereinafter with reference to FIGS. 5A and 5B explaining the relation between the temperature T and the number N of discharges. FIG. 5A illustrates changes in voltage of the integrating capacitor 2 at the reference temperature $T_1$ and FIG. 5B illustrates changes in voltage of the integrating capacitor 2 at the temperature $T_2$ different from the reference temperature $T_1$.

As shown in FIG. 5A, in case where the temperature detected by the temperature sensor 21 during the preliminarily charging is substantially equal to the reference temperature $T_1$, the number of discharges of the integrating capacitor 2 in the first integrating is set to the reference number $N_1$ of discharges. When the discharge during the first integrating is performed $N_1$ times, the voltage of the integrating capacitor 2 is decreased from the preliminarily charged voltage $V_{REF}$ to the voltage $V_1$. The differential voltage ($V_{REF}-V_1$) corresponds to the distance to the object 30. By the charge at the constant rate during the second integrating, the voltage of the integrating capacitor 2 is restored from $V_1$ to $V_{REF}$. A charging period $t_1$ for the second integrating corresponds to the differential voltage ($V_{REF}-V_1$), that is, to the distance to the object 30. Thus, the distance to the object 30 can be determined based on the charging period $t_1$ for the second integrating.

Figure 5B:
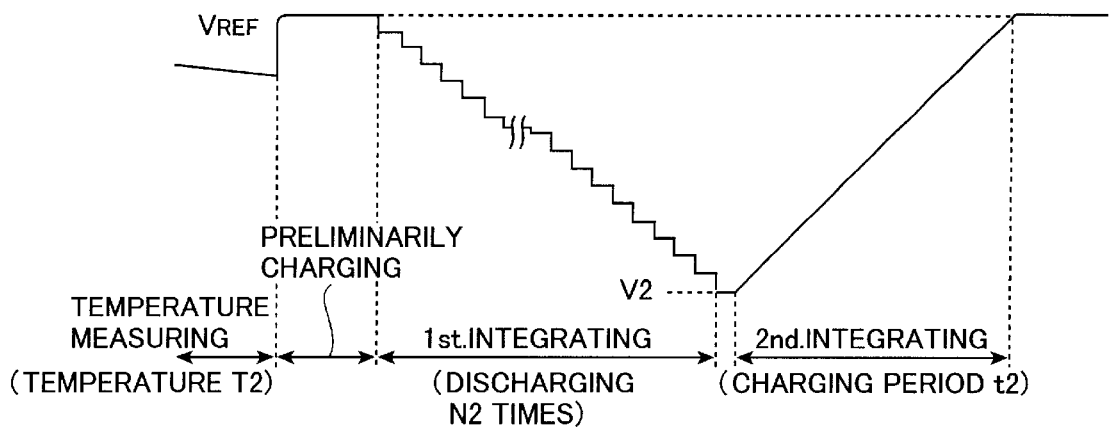

As shown in FIG. 5B, in case where the temperature detected by the temperature sensor 21 during the preliminarily charging is substantially equal to the temperature $T_2$, the number $N_2$ of discharges of the integrating capacitor 2 in the first integrating can be set in the following manner. A signal output from the arithmetic unit 15 changes dependent on temperature, even if the distance to the object 30 is fixed. When the output signal from the arithmetic unit 15 increases with the changes in temperature, the number $N_2$ of discharges is set to be less than $N_1$, and when the output signal from the arithmetic unit 15 decreases with the changes in temperature, the number $N_2$ of discharges is set to be more than $N_1$. Because of this, temperature influences can be counterbalanced.

If the number $N_2$ is set as described above, the voltage of the integrating capacitor 2 decreases from the preliminarily charged voltage $V_{REF}$ to the voltage $V_2$ as a result of the discharges $N_2$ times during the first integrating. The voltage $V_2$ is substantially equal to the voltage $V_1$ in the case of reference temperature $T_1$. By the subsequent charge at the constant speed during the second integrating, the voltage of the integrating capacitor 2 is restored from $V_2$ to $V_{REF}$. The duration $t_2$ for the second integrating corresponds to the differential voltage ($V_{REF}-V_2$) and substantially equals to the charging period t, in the case of reference temperature $T_1$. That is, the charging period $t_2$ corresponds to the distance to the object 30. In this manner, the distance to the object 30 can also be determined based on the charging period $t_2$ of the second integrating in the case of temperature $T_2$.

Figure 6A:
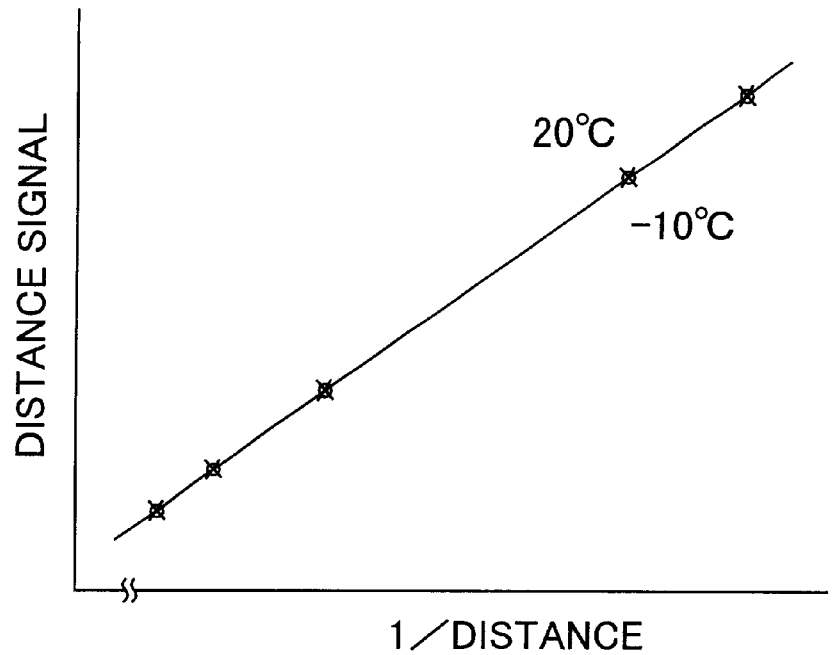
FIGS. 6A and 6B are graphs each showing the relation between the actual distance t o the object to be measured and the distance signal output from the integrating unit.
Figure 6B:
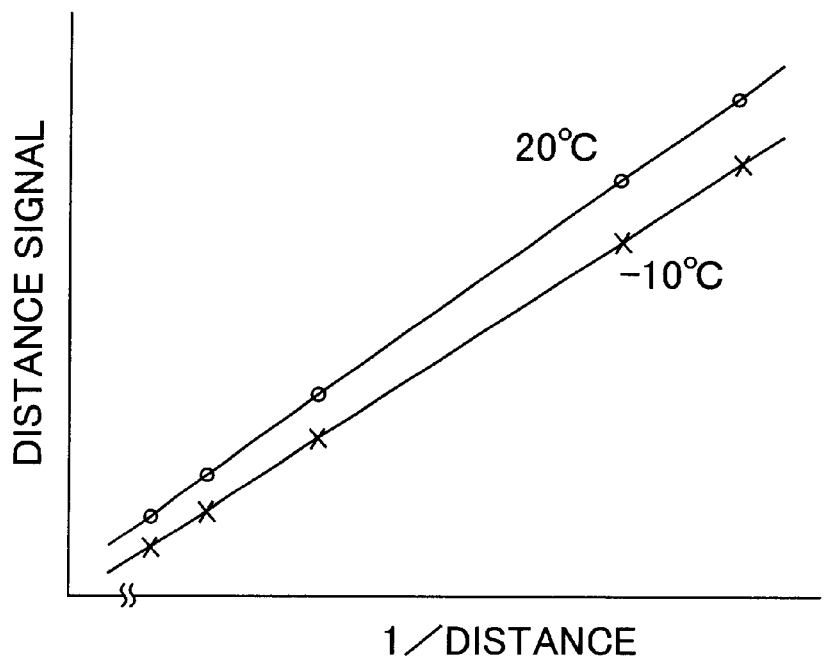

FIGS. 6A and 6B are graphs obtained in the distance measurement systems according to the present embodiment and the prior art, each graph showing the relation between the actual distance to the object 30 and the distance measurement signal output from the integrating unit 16. More specifically, FIG. 6A shows the data relating to the distance measurement system and FIG. 6B shows the data relating to the prior distance measurement system. In these figures, the results of the distance measurements obtained at the temperatures of 20°C. and −10°C. are illustrated. As shown in FIG. 6B, in case of the prior art system, the distance signal output from the integrating unit varies with the temperature, even if the actual distance to the object 30 is fixed. In contrast with the prior art, with the distance measurement system according to the present embodiment, the distance signal output from the integrating unit 16 is substantially unchanged with the temperature as shown in FIG. 6A, provided that the actual distance to the object 30 is fixed. This results in a less error in distance measurement.

It will be understood from the foregoing that the voltage level of the integrating capacitor 2 at the end of the first integrating does not depend on the temperature, but changes dependent on the distance to the object 30 alone, by properly setting the number of discharges of the integrating capacitor 2 during the first integrating so that they are responsive to changes in temperature. Thus, the distance to the object 30 obtained based on the charging period of the second integrating also does not depend on the temperature, so that little error occurs in distance measurement even if the temperature varies.

Furthermore, by properly setting the number of discharges of the integrating capacitor 2 during the first integrating so that they are responsive to changes in temperature, a single transformation independent of the temperature can be used when the distance to the object to determine a control signal for driving the lens 18 by the lens driving unit 17 in order to set a proper focus. In addition, as the number of discharges is an integer, it is not necessary to carry out multiplication and division imposing a considerable load on the CPU 19 in calculating the number of discharges. This means that a capacity of a memory such as an EEPROM preliminarily storing parameters and so on may be diminished and a calculation load on the CPU 19 may also be diminished.

Preferably, the number N of discharges of the integrating capacitor 2 may be determined by carrying out either of addition and subtraction with respect to the reference $N_1$ number of discharges. Then, the size of a program to determine the number of discharges N may become smaller.

Second Example

A distance measurement system according to the second embodiment of the present invention will be explained hereinafter. The configuration and the operation of the distance measurement system according to the second embodiment are substantially similar to those of the first embodiment. The only difference from the first embodiment is in that each of the discharges of the integrating capacitor 2 during the first integrating is controlled based on the temperature measured by the temperature sensor 21.

Figure 7A:
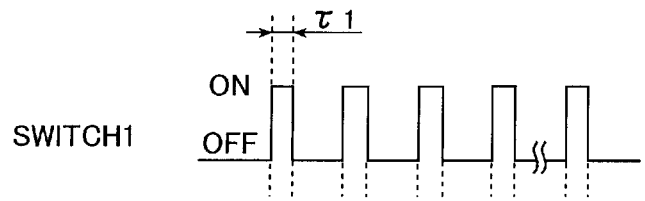
FIGS. 7A to 7D are timing charts for explaining the relation between the temperature T and the discharging period τ.
Figure 7B:
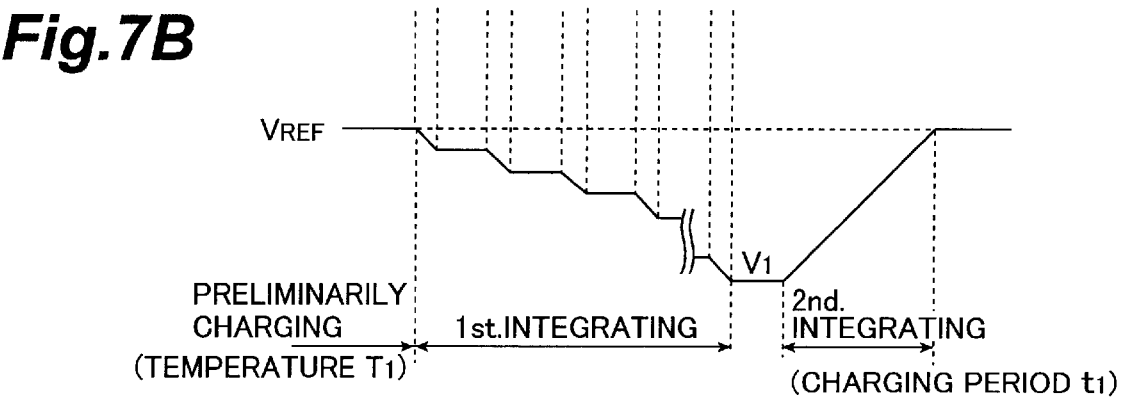
Figure 7C:
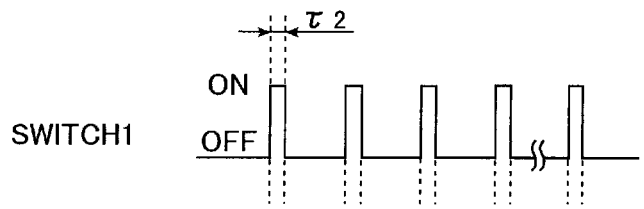
Figure 7D:
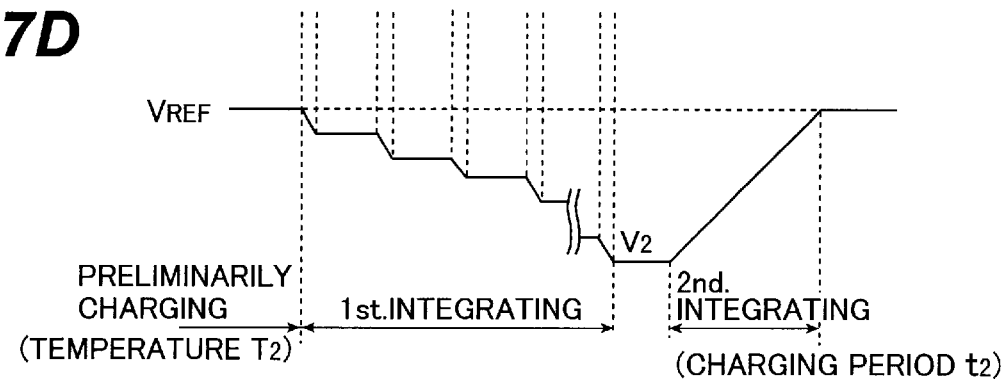

FIGS. 7A to 7D are views for explaining the relation between the temperature T and the discharging period τ(i.e., a period of time during which the switch 1 is on). More specifically, FIGS. 7A and 7B are timing charts showing, respectively, the on-off operation of the switch 1 and the variations in voltage of the integrating capacitor 2 at the temperature $T_1$. FIGS. 7C and 7D are timing charts showing, respectively, the on-off operation of the switch 1 and the voltage variations of the integrating capacitor 2 at the temperature $T_2$ different from the reference temperature $T_1$.

As shown in the timing charts of FIGS. 7A and 7B, in case where the temperature detected by the temperature sensor 21 during the preliminarily charging period is substantially equal to the reference temperature $T_1$, the reference discharging period $\tau_1$ is set as a period of each discharge of the integrating capacitor 2 in the first integrating. By the discharges during the first integrating, the voltage of the integrating capacitor 2 is decreased from the preliminarily charged voltage $V_{REF}$ to the voltage $V_1$. The differential voltage ($V_{REF}-V_1$) corresponds to the distance to the object 30. By the subsequent charge at the constant rate during the second integrating, the voltage of the integrating capacitor 2 is restored from $V_1$ to $V_{REF}$. A duration $t_1$ for the second integrating is in proportion to the differential voltage ($V_{REF}-V_1$), that is, to the distance to the object 30. Thus, the distance to the object 30 can be determined based on the duration $t_1$ for the second integrating.

As shown in FIGS. 7C and 7D, in case where the temperature detected by the temperature sensor 21 during the preliminarily charging is substantially equal to the temperature $T_2$, a charging period $\tau_2$ of each discharge of the integrating capacitor 2 in the first integrating is set in the following manner. When a signal output from the arithmetic unit 15 changes due to variations in temperature even if the distance to the object 30 is fixed, the discharging period $\tau_2$ is adjusted with respect to the reference discharge duration $\tau_1$ so that the quantity of one discharge of the integrating capacitor 2 maintains a level equal to the discharge quantity in case of the reference discharging period $\tau_1$. As a result, influences due to variations in output signal from the arithmetic unit 15 caused by temperature changes can be counterbalanced.

If the discharging period $\tau_2$ is set as described above, the voltage of the integrating capacitor 2 decreases from the preliminarily charged voltage $V_{REF}$ to the voltage $V_2$ as a result of the discharge during the first integrating. The voltage $V_2$ is substantially equal to the voltage $V_1$ in case of the reference temperature $T_1$. By the subsequent charge at the constant speed during the second integrating, the voltage of the integrating capacitor 2 is restored from $V_2$ to $V_{REF}$. The charging period $t_2$ for the second integrating is in proportion to the differential voltage ($V_{REF}-V_2$) and substantially equals to the duration $t_1$ in case of the reference temperature $T_1$. That is, the duration $t_2$ is in proportion to the distance to the object 30. In this manner, the distance to the object 30 can also be determined based on the charging period $t_2$ for the second integrating even in case of the temperature $T_2$.

It is noted that the distance measurement system according to the present example can exhibit the same advantages as those obtained by the first example.

Preferably, the discharging period $\tau$ of the integrating capacitor 2 may be determined by carrying out subtraction with respect to the reference discharging period $\tau_1$. Then, the size of a program to determine the discharging period $\tau$ becomes smaller. Also, deterioration in distance measurement accuracy due to an error of standing-light component removal may be prevented by doing so.

Third Example

A distance measurement system according to the third embodiment of the present invention will be explained hereinafter. The configuration and the operation of the distance measurement system according to the third embodiment are substantially similar to those of the first embodiment. The only difference from the first embodiment is in that the charging rate in the second integrating is controlled based on the temperature measured by the temperature sensor 21.

Figure 8A:
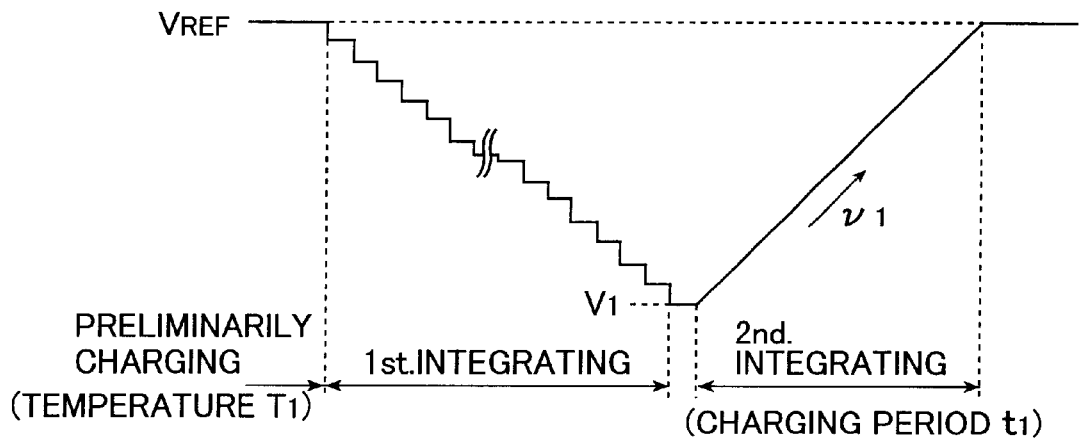
FIGS. 8A and 8B are views for explaining the relation between the temperature T and the each charging rate v.
Figure 8B:
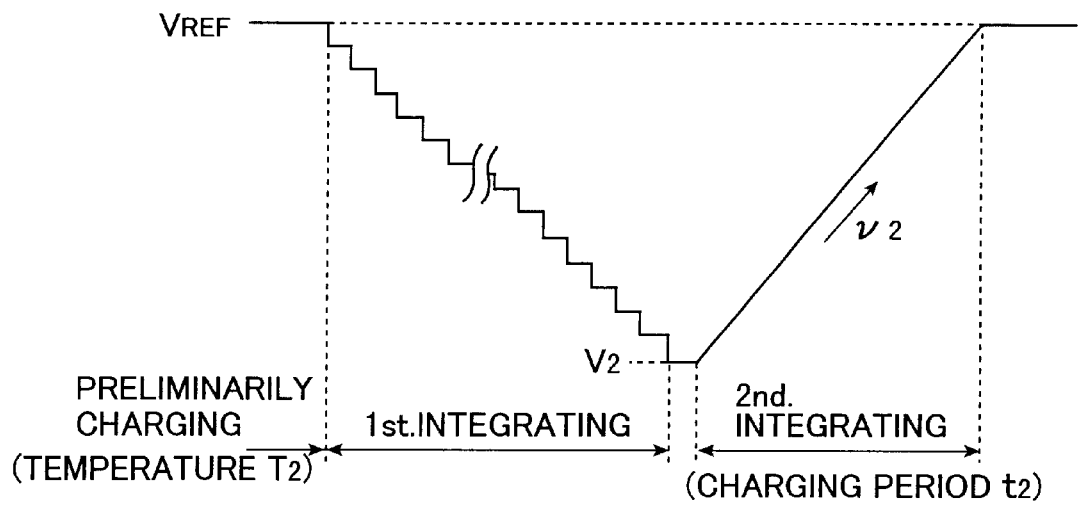

FIGS. 8A and 8B are views for explaining the relation between the temperature T and the charging rate v (i.e., a value of output current from the constant current source 4). More specifically, FIG. 8A shows the change in voltage of the integrating capacitor 2 at the reference temperature $T_1$ and FIG. 8B shows the change in voltage of the integrating capacitor 2 at the temperature $T_2$ different from the reference temperature $T_1$.

As shown in FIG. 8A, in case where the temperature detected by the temperature sensor 21 during the preliminarily charging period is generally equal to the reference temperature $T_1$, the voltage of the integrating capacitor 2 is decreased from the preliminarily charged voltage $V_{REF}$ to the voltage $V_1$. The differential voltage ($V_{REF}-V_1$) is in proportion to the distance to the object 30. By the subsequent charge at the charging rate $v_1$ during the second integrating, the voltage of the integrating capacitor 2 is restored from $V_1$ to $V_{REF}$. A charging period $t_1$ for the second integrating is in proportion to the differential voltage ($V_{REF}-V_1$), that is, to the distance to the object 30. Thus, the distance to the object 30 can be determined based on the charging period $t_1$ for the second integrating.

As shown in FIG. 8B, in case where the temperature measured by the temperature sensor 21 during the preliminarily charging period is generally equal to the temperature $T_2$, the charging rate $v_2$ of the integrating capacitor 2 in the second integrating can be set in the following manner. When a signal output from the arithmetic unit 15 changes with temperature even if the distance to the object 30 is fixed, the charging rate $v_2$ in the second integrating is adjusted with respect to the reference charging rate $v_1$ so that the charging period of the second integrating is made constant. As a result, the influences due to variations in output signal from the arithmetic unit 15 caused by temperature changes can be counterbalanced.

If the charging rate $v_2$ is set as described above, the voltage of the integrating capacitor 2 decreases from the preliminarily charged voltage $V_{REF}$ to the voltage $V_2$ as a result of the discharge during the first integrating. However, by the subsequent charging up at the rate $v_2$ during the second integrating, the voltage of the integrating capacitor 2 is restored from $V_2$ to $V_{REF}$. The charging period $t_2$ for the second integrating substantially equals to the charging period $t_1$ in case of the reference temperature $T_1$. That is, the duration $t_2$ is in proportion to the distance to the object 30. In this manner, the distance to the object 30 can also be determined based on the charging period $t_2$ of the second integrating even in case of the temperature $T_2$.

It is noted that the distance measurement system according to the present example can exhibit the same advantages as those obtained by the first and second examples.

The present invention is not limited to the aforementioned embodiments and many modifications can be made thereto. For example, the invention is also applicable to a system including such an integrating unit, in which charging or discharging of an integrating capacitor are carried out in a manner contrary to that in the aforementioned embodiments. That is, during the period of the first integrating, the integrating capacitor 2 may be charged so that the voltage level thereof ascends step by step and then discharged at a time in the second integrating. The distance to the object is obtained on the basis of the time required for the second integrating in aforementioned first and second example, but it may also be obtained on the basis of the charged or discharged voltage of the integrating capacitor 2 after the first integrating with an A/D conversion.

It is also possible that only period of part of the discharges of the integrating capacitor during the first integrating is set in response to the detected temperature. Both of the number of discharges and the discharging period of the integrating capacitor during the first integrating may be set in proportion to the detected temperature. This makes it easy to carry out fine tuning responsive to the temperature.

With the aforementioned embodiments, the first integrating level $V_1$ is supposed to vary with the temperature. However, the invention is applicable to such cases where only the second integrating period $t_1$ varies, or both of the first integrating level $V_1$ and the second integrating period $t_1$ vary.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. An active distance measurement system comprising:
    a light source for emitting a series of light pulses toward an object at a distance to be measured;
    a position sensing detector for detecting the light pulses reflected from the object and outputting signals, each signal corresponding to a position where a light pulse reflected from the object is detected;
    an arithmetic unit outputting signals corresponding to the distance to the object in response to the signals output from said position sensing detector;
    an integrating capacitor set to a reference voltage before emission of the series of light pulses, said capacitor being charged or discharged by signals output from said arithmetic unit;
    a distance detection unit for detecting the distance to the object based on a voltage of said capacitor present after emission of the series of light pulses;
    a temperature sensing unit for measuring ambient temperature; and
    a control unit for controlling said distance measurement system to adjust charging and discharging operations of said capacitor by said arithmetic unit in response to the ambient temperature measured by said temperature sensing unit to offset a temperature dependency of the voltage of said capacitor present after emission of the series of light pulses.

2. The distance measurement system according to claim 1, wherein said control unit adjusts at least one of number and period of the charging and discharging operations of said capacitor by said arithmetic unit.

3. The distance measurement system according to claim 2, wherein said control unit adjusts at least one of number of the charging and discharging operations of said capacitor, relative to a reference number, by said arithmetic unit.

4. The distance measurement system according to claim 2, wherein said control unit adjusts the period of the charging and discharging operations of said capacitor to be shorter than a reference period in response to a change in ambient temperature relative to a reference temperature.

5. The distance measurement system according to claim 1, wherein said control unit adjusts the signals output from said arithmetic unit in response to the ambient temperature measured by said temperature sensing unit to adjust the charging and discharging operations of said capacitor.

6. An active distance measurement system comprising:
    a light source for emitting a series of light pulses toward an object at a distance to be measured;
    a position sensing detector for detecting the light pulses reflected from the object and outputting signals, each signal corresponding to a light pulse and a position on the position sensing detector where a light pulse reflected from the object is detected;
    an integrating capacitor set to a reference voltage before emission of the series of light pulses, said capacitor being charged or discharged in a first integration by signals output from said position sensing detector and respectively corresponding to the light pulses;
    a distance detection unit detecting the distance to the object by discharging or charging said capacitor at a constant rate to the reference voltage, after emission of the series of light pulses;
    a temperature sensing unit for measuring ambient temperature before emission of the series of light pulses; and
    a control unit receiving the ambient temperature measured and controlling said distance measurement system by changing at least one of the number of the light pulses emitted in the series of light pulses, duration of the light pulses emitted in the series of light pulses, and the constant rate of discharging or charging of said capacitor, after emission of the series of light pulses, in response to the ambient temperature measured.

* * * * *